Patented Dec. 20, 1938

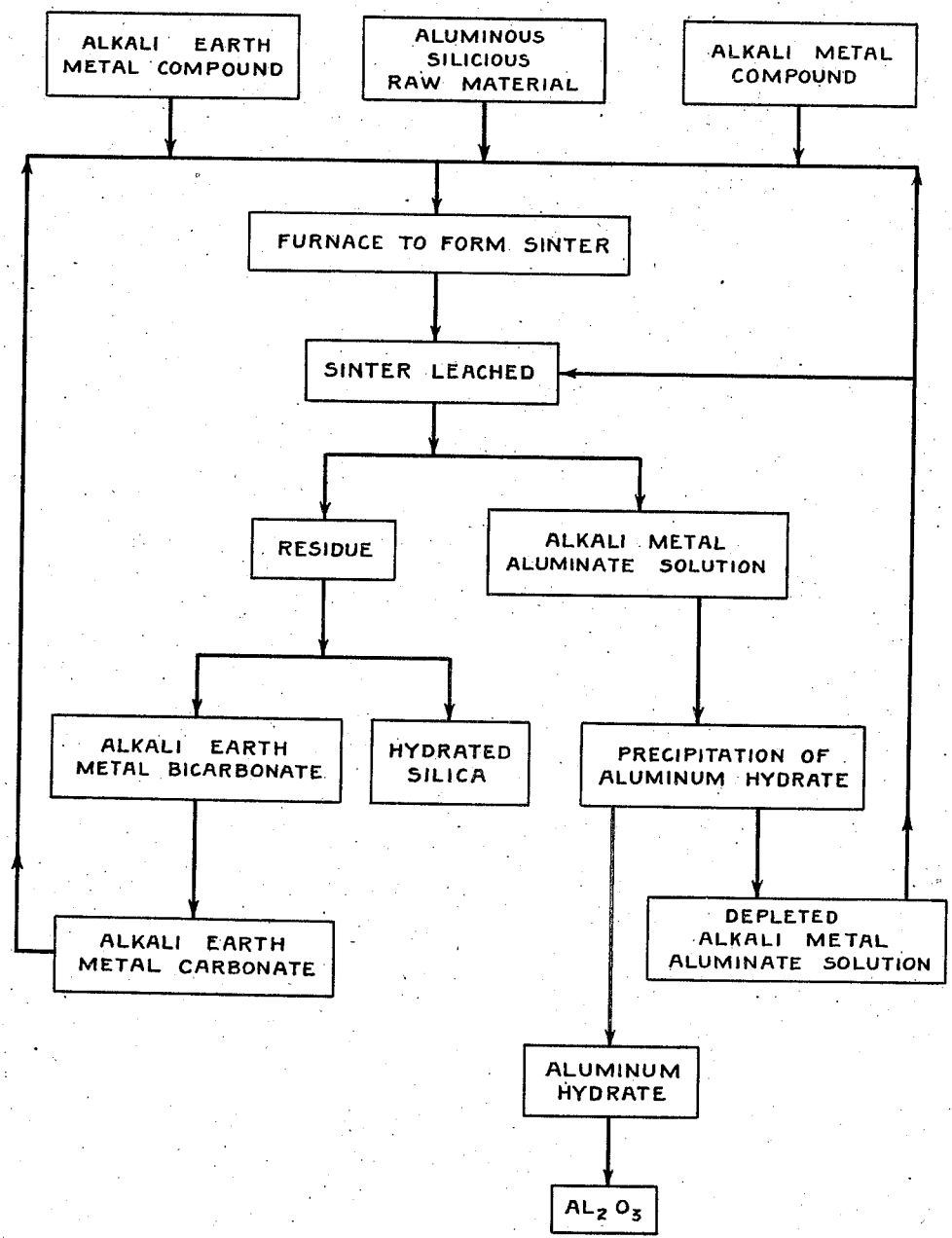

2,141,132

UNITED STATES PATENT OFFICE 2,141,132

PROCESS OF TREATING SILICEOUS MATERIALS

Roy C. Folger, Cleveland Heights, Ohio, assignor to The Cowles Detergent Company, a corporation of Ohio Application June 11, 1936, Serial No. 84,717

5 Claims. (Cl. 23—143)

This invention relates to the recovery of alumina from raw materials containing it, and particularly relates to improvement in the process of extracting alumina from silicate minerals or siliceous materials such as feldspar, leucite, clay, shale, marl, blast furnace slag, siliceous bauxite; the residue from burning coal, waste coal products, and other suitable material.

More particularly this invention relates to improvements in the recovery of alumina by processes wherein a charge containing the aluminous material, an alkali earth metal compound and alkali metal compound in suitable proportions, is furnaced to form a sintered product from which an alkali metal aluminate solution may be dissolved, leaving an insoluble residue constituted largely of an alkali earth metal silicate, for instance such as dicalcium silicate.

An object of this invention is to provide a practical and economical process for the recovery of alumina from aluminous material, using cheap and readily available raw materials.

Another object of this invention is to provide a process in which the reagent materials required for carrying out the process may be re-used in such a way that only enough of them will have to be added from outside sources to replace losses incurred in carrying out the process.

A further object of this invention is to provide a process in which the alkali earth metal compound is re-used cyclically only enough alkali earth metal compound from outside sources being added to the furnace charge to replenish losses of such compound, incurred in conducting the process, or to replace amounts of such compound which may be withdrawn from the process for other use.

Another object is to provide a process wherein the insoluble residue, resulting from dissolving out the alkali metal aluminate from the sintered product, may be economically treated to recover silica in a form that is commercially useful, or may be readily converted into commercial by-products, and at the same time recover an alkali earth metal compound in suitable form for re-use in the process, or which may be withdrawn advantageously for other use.

A further object is to provide a process in which carbonic acid gas derived from the furnacing operations, either evolved from the combustion of fuel or from the dissociation of carbonate compounds, may be economically and advantageously utilized in the treatment of the residue resulting from the sintered product.

Another object of the present invention is to provide an economical means of separating the alkali earth metal compound and the hydrated silica recovered from treatment of the residue resulting from the sintered product, by utilizing a portion of the residue as a filter-aid or filter medium in effecting this separation.

For the purpose of recovering alumina there have been proposed numerous processes in which aluminous siliceous material, an alkali earth metal compound, and an alkali metal compound are mixed and furnaced to form a sinter, from which an alkali metal aluminate solution is extracted, leaving a residual material constituted largely of an alkali earth metal silicate such as dicalcium silicate. These processes differ in regard to the proportions and compositions of the alkali earth metal and alkali metal compounds used with the aluminous siliceous material, and in certain details of the process relating to the extraction of the alkali metal aluminate solution and subsequent recovery of alumina therefrom and in regard to recovery, rectification and re-use of the materials, or in their disposal as useful by-products, or as waste material.

In practicing this invention, it is possible and it may be advantageous to employ the present improvement in combination with features of known processes, which utilize aluminous material, especially aluminous siliceous material, an alkali earth metal compound, and an alkali metal compound furnaced to form a sinter, treated to extract an alkali metal aluminate solution, from which alumina may be subsequently recovered, and leaving a residue constituted largely of an alkali earth metal silicate or silicates.

The scheme of the present invention is illustrated in the flow diagram accompanying this description.

In practicing the present invention, a furnace charge is prepared by mixing together the aluminous siliceous material, an alkali earth metal compound, and an alkali metal compound in suitable proportions. The materials for the furnace charge should preferably be in fine condition and they may be ground separately and subsequently mixed, or may be ground together in any suitable manner so that they are intimately mixed and in fine condition, and the materials may be dry or moist, or in the form of a slurry, as desired.

The aluminous raw material may be any suitable material that is cheap and readily available, such as feldspar, leucite, clay, shale, marl, blast furnace slag, siliceous bauxite; the residue from burning coal, waste coal products, and others containing more or less silica. As will more fully appear hereinafter, a portion of the aluminous material forming this charge may be derived from the residual liquor resulting from the treatment of an alkali metal aluminate solution obtained later in the process.

The alkali earth metal compound used in proportioning the charge may be introduced in the form of limestone, burnt or calcined lime, waste sludges from other processes, sea shells, coral rock, chalk, marble dust, marl, and blast furnace slag. As will be more fully explained hereinafter, it is quite possible that only sufficient alkali earth metal compound need be added to replace losses of the system in forming the furnace charge, and in some cases, dependent on the composition of the aluminous siliceous material used, it may not be necessary to add any alkali earth metal compound other than that recovered from the system.

The alkali metal compound used in proportioning the charge may be in the form of potassium or sodium carbonates or hydroxides of these metals. Another source of the alkali metal compound may be an artificially prepared alkali metal silico aluminate which may be formed by furnacing a portion of the aluminous siliceous material with sodium chloride in the presence of steam as disclosed in my co-pending application Serial No. 732,569, filed June 27, 1934. The alkali metal compound may be supplied in part by an alkali metal compound recovered later in the process, as explained herein. Furthermore, the alkali metal oxide content may be supplied partially, wholly, or even in excess from natural minerals, such as feldspar, leucite, micas and others that might be a source of alumina as well.

In preparing the furnace charge, the amounts used of the three materials, aluminous raw material, alkali earth metal compound, and alkali metal compound, may be proportioned on the basis of any suitable molecular ratio of alkali earth metal oxide to silica and any suitable molecular ratio of alkali metal oxide to aluminum oxide, such, for example, as a molecular ratio of 2 molecules of calcium oxide to each molecule of silica and 1 to 1.7 molecules of sodium oxide to each molecule of aluminum oxide. The molecular ratio usually desired of alkali metal oxide to aluminum oxide is from about 1.2 to 1 to about 1.5 to 1.

The charge thus prepared is introduced, in a condition that may be dry, semi-dry, or in the form of a wet slurry, into a suitable furnace, such, for example, as a rotary furnace, and heated to a temperature that may be from 1150° C. to 1400° C., depending upon the relative composition of the charge, to form a sintered product, which may be cooled after being discharged from the furnace.

The sintered product thus produced may then be ground preparatory to treatment for dissolving from it, an alkali metal aluminate solution. This dissolving treatment may be by any suitable means, depending on the nature and composition of the sinter, as for example, under pressure and temperature like in an autoclave, or by some simpler and cheaper method of leaching or lixiviation. The dissolving liquid may be plain water or any solution suitable in composition, strength, concentration, density, and temperature adapted to meet the requirements of the particular dissolving method employed, the composition of the sinter, and the composition and character of the alkali metal aluminate solution obtained. For example the sinter may be leached with a sodium aluminate solution, resulting as a residual liquor, or lye, largely depleted with respect to alumina due to treatment to precipitate aluminum hydrate.

It may then be advantageous to subject the alkali metal aluminate solution, obtained from the sinter, to some suitable purification treatment for the removal of impurities that might otherwise contaminate the alumina finally recovered. For example, the sodium aluminate solution may be heated in an open vessel or under pressure to precipitate and settle out unreacted silica or zeolitic compounds of silica, alumina and alkali.

The alkali metal aluminate solution, which may or may not have been subjected to some purification treatment may then be submitted to suitable treatment for removal of the contained alumina, or at least a substantial portion thereof. This may be done by known methods such as the Bayer method, wherein a sodium aluminate solution, rich in alumina is "seeded" with aluminum hydrate particles, recovered later in the process, and substantially pure aluminum hydrate precipitated from the alkali metal aluminate solution. The precipitated aluminum hydrate may then be separated by filtration or other suitable means, from the depleted alkali metal aluminate solution.

The recovered aluminum hydrate may then be dried to remove superficial moisture, and then may be available as a useful commercial product, or it may be calcined to remove the water of hydration, to yield a substantially pure anhydrous alumina desirable for many uses, particularly in the production of metallic aluminum.

From the treatment to recover alumina from the alkali metal aluminate solution, there is left a residual liquor which may be wholly or partially depleted with respect to alumina, depending on what method of precipitation is used and how far the precipitation is carried. For example, with the Bayer method referred to above it is usual to allow the precipitation to proceed to a point where only a portion, such as 75% or 80% of the contained alumina is recovered. The residual liquor may then be submitted to the action of carbon dioxide gas to precipitate substantially all the remaining alumina, which may then be separated and removed, leaving a residual alkali metal carbonate solution, which may be evaporated and concentrated for re-use in forming the furnace charge, because of the alkali metal oxide content. Or the residual liquor from which the alumina has not been completely removed, may be concentrated and re-used in the furnace charge, not only on account of the alkali metal oxide content but also to enrich the furnace charge with respect to alumina. An advantageous modification of this procedure may be to withdraw a portion of the depleted alkali metal aluminate solution and re-use it in the process, in forming a solution for dissolving or leaching the alkali metal aluminate from the sinter. According to another method, the alkali metal aluminate solution extracted from the sinter may be subjected to the action of carbon dioxide gas to precipitate substantially all of the contained alumina, leaving a residual alkali metal carbonate solution which may be evaporated and concentrated for re-use in forming furnace charges.

It is to be understood there may be modifications and variations in the procedure outlined above without interfering with, or departing from the spirit or purpose of the present invention. For example, the residual liquor, resulting from the treatment of an alkali metal aluminate solution to recover alumina by either of the above recited methods, may be subjected to further treatment to recover a portion at least of the alkali metal content in commercially useful form. Such a treatment may be particularly advantageous where more alkali metal compound enters the process than is required to replenish losses of alkali metal oxide content incurred in conducting the process. Such a condition may exist where feldspar, leucite, or material containing a substantial amount of alkali metal compound is used in preparing the furnace charge.

Furthermore, according to the present invention, the residue resulting from treating of the sintered product to obtain an alkali metal aluminate solution, may be treated to recover from the residue an alkali earth metal compound that may be advantageously reused in the process, and silica in a chemically active form may be recovered as a useful by-product.

The residue may be composed of one or more alkali earth metal silicates, depending upon the relative proportions of the alkali earth metal compound or compounds and the silica in the furnace charge. For example, the residue from the furnace charge in which the molecular proportion of 2 molecules of calcium oxide to 1 molecule of silica has been used will be composed of dicalcium silicate and there may be some magnesium silicate, depending upon whether a magnesium compound is present in the aluminous siliceous material or in the alkali earth metal compound utilized in the furnace charge.

The composition of the insoluble residue may vary considerably, depending upon the composition, proportioning, and furnacing of the raw materials used, and the treatment of the sinter. By way of example, the insoluble residue may have a composition such as follows: $SiO_2$—30%; $Al_2O_3$—5%; $Fe_2O_3$—6%; $CaO$—53%; $MgO$—2%; $Na_2O$—2%; and other material 2%.

While this residue has been ground prior to the dissolving of the sodium aluminate therefrom, it may be desirable to comminute or pulverize it, as by further grinding, in preparation for the next step of the process. The residue is then mixed with water through which carbon dioxide gas is passed in any suitable manner, so as to provide a wide and uniform distribution of the carbon dioxide throughout the mixture. The residue may be wholly or partially in suspension or may be agitated to keep it in suspension for better reaction with the carbon dioxide. It may be more efficient and economical to pass a portion or the entire residue through a colloid mill to put it in extremely finely divided condition, whereby it will provide a more complete suspension.

The carbon dioxide gas reacts with the alkali earth metal silicates in the residue and forms a soluble alkali earth metal carbonate and hydrated silica, which is insoluble in the presence of the carbonate compounds formed.

Hydrated silica of several different compositions may be formed, such as metasilicic acid $H_2O.SiO_2$, disilicic acid $H_2O.2SiO_2$, polysilicic acid $2H_2O.3SiO_2$, and orthosilicic acid $2H_2O.SiO_2$, depending on the composition of the alkali earth metal silicate in the residue. For example, in a residue resulting from a sinter formed from a furnace charge proportioned to have a ratio of 2 molecules of calcium oxide to each molecule of silica, the alkali earth metal silicate would be in the form of dicalcium silicate $2CaO SiO_2$, or the orthosilicate of calcium, as it may sometimes be called. In such a case the reaction would be

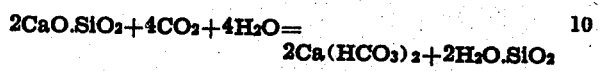

resulting in the formation of two molecules of bicarbonate of lime or the acid carbonate of lime, as it may be called, and one molecule of orthosilicic acid, the former existing in water solution and the latter as a somewhat gelatinous precipitate, which may be separated by any suitable means, as for example, by filtration. The bicarbonate of lime which is in the filtrate may then be converted to calcium carbonate, for example by heating the solution and concentrating it sufficiently to form the carbonate according to the following reactions.

The calcium carbonate being in a finely divided form is particularly suitable for use in forming other furnace charges without preliminary grinding. By utilizing the residual calcium carbonate thus obtained in forming additional furnace charges it will be seen that the entire calcium content of the furnace charge is returned to the process, except for slight losses in the system, so that it is unnecessary to add additional calcium compound in making further furnace charges, except in an amount necessary to replace such losses.

In the event that aluminous siliceous material is utilized which contains more calcium oxide than necessary for the desired molecular proportions, such excesses of calcium carbonate as will be formed in this residue may be used in other processes, such as for the manufacture of cement or the like.

The hydrated silica may be utilized for a number of well known purposes in the somewhat gelatinous condition in which it is recovered. Also it may be dried to remove superficial moisture, which facilitates its handling and shipping and in which condition it may be more suitable for many purposes, where active silica is desired. In the event that the treatment of the finely divided residue with carbon dioxide is not carried to completion according to the reaction above set forth, the dicalcium silicate which will remain with the hydrated silica after the filtering operation will be beneficial as an addition to cement. Also, it may be noted that any unconverted dicalcium silicate will be advantageous as a filter aid or filter medium in separating the hydrated silica from the solution remaining from the treatment with $CO_2$.

Carbon dioxide for treatment of the residue may be conveniently and cheaply obtained from the waste gases of the sintering furnace, or it may be recovered from the heating of the bicarbonate of lime solution to form carbonate of lime, or from any other suitable source.

In the operation to separate the hydrated silica from the bicarbonate of lime solution, a portion of the ground residue may be conveniently used as a filter aid or filter medium. This is because of its physically porous condition, and because of its chemical composition which is similar to that of the material being filtered, thus avoiding reactions between the filter medium and the material being filtered.

A particularly important use of the recovered chemically active silica, for example the orthosilicic acid recovered as a by-product from the insoluble residue from the leaching operation, may be its use as an ingredient in making concrete, cement, mortar and the like where free lime appears on hydration.

Although the mechanism of hydration and its relation to hydraulicity and hardening in Portland cement is considered a rather complex reaction and is a somewhat controversial subject, it is generally accepted that the higher lime silicates hydrate down to silicates containing less lime and that other compounds of lime, for instance compounds of lime with alumina and with iron oxide follow a similar action, leaving free or uncombined lime in the form of calcium hydrate in the finished concrete or mortar. One theory is that the higher lime silicates and the other higher lime compounds hydrate down to monocalcium hydrosilicate, and to monocalcium hydroferrite and hydroaluminate, etc. Another theory is that the lower lime, molecular ratio compounds formed on hydration depends upon the concentration of lime in the hydration solution, and the lower lime compounds formed may have any molecular ratio between 2 and 1 of calcium oxide to one of the other compound.

Whatever the molecular composition of the hydration products may be, it is generally accepted that the reactions of hydration account for the presence of free lime in hardened cement, concrete and mortar. From various standpoints this free lime is quite objectionable. For example, free lime as such is not regarded as contributing to the strength of hardened cement or concrete and free lime renders cement and concrete subject to disintegration under the action of acid and alkaline ground waters, and liable to attack from sea water and other corrosive influences.

In order to counteract the ill effects of free lime, various puzzolanic materials, trass, blast furnace slag and other materials, thought to be effective because of a more or less content of active silica, have been added. However, the amount of active silica in such added materials is usually small, and their use introduces other compounds that may be definitely harmful or at least objectionable because of the relatively large amount of inert material. While such additions have, in the past, been made with a view of protection against acids and other corrosive influences, there is a wide belief that the ultimate strength of cement and concrete can be increased by bringing the free lime liberated during hydration, into combination with active silica in suitable form which may be mixed with the cement and other ingredients, prior to or during hydration.

Thus the active silica which may be economically produced in quantitative amounts by the present invention, will find an important commercial utilization in connection with making stronger and more durable cement and concrete.

Heretofore, in recovering alumina by the alkali sinter method of processing it has been necessary to supply all the alkali earth metal compound, required for the furnace charge, from outside sources. Under such conditions, for example the limestone that might be used in preparing the furnace charge, would have to be wasted in the form in which it appears in the residue, or the residue containing it would have to be converted into some commercially useful by-product. In situations where limestone may be expensive and difficult to obtain, this difficulty would largely be overcome by the present invention, wherein the alkali earth metal compound may be re-used and only enough limestone added to the process to make up for losses incurred in conducting the process.

Having thus declared the purpose and disclosed the features of my invention, what I claim is:

1. In the process of treating aluminous siliceous material containing a substantial proportion of silica by the process steps of mixing and sintering the material with an alkali earth metal compound and an alkali metal compound to form alkali earth metal silicates and alkali metal aluminate, dissolving out the alkali metal aluminate from the sinter, and recovering the alumina and alkali metal compound from the alkali aluminate solution, the improvement which comprises treating the residue with carbon dioxide to form hydated silica and a bicarbonate of the alkali earth metal, separating the hydrated silica and the alkali earth metal bicarbonate, converting the bicarbonate to form an alkali earth metal carbonate, and utilizing the alkali earth metal carbonate thus obtained in forming additional charges for the sintering.

2. In the process of treating aluminous siliceous material containing a substantial proportion of silica by the process steps of mixing the material with a calcium compound yielding calcium oxide and sodium compound yielding sodium oxide in predetermined proportions to form a furnace charge, sintering the charge, grinding the sinter, and dissolving out the sodium aluminate from the sinter, the improvement which comprises pulverizing the residue and forming an aqueous suspension of the finely divided residue, treating the suspension with carbon dioxide to form hydrated silica and calcium bicarbonate, separating the hydrated silica therefrom, and converting the calcium bicarbonate to calcium carbonate, and utilizing the calcium carbonate for additional furnace charges.

3. A process for treating aluminous siliceous material containing a substantial proportion of silica to recover alumina and hydrated silica, which comprises the process steps of mixing the material with a calcium compound recovered at a subsequent stage of the process and an alkali metal compound to form a furnace charge, sintering the charge, dissolving out the alkali metal aluminate from the sinter, thereby leaving a residue of calcium silicate, treating the calcium silicate with an excess of carbon dioxide to form hydrated silica and soluble calcium bicarbonate, extracting the silica and recovering calcium carbonate in finely divided form suitable for incorporation in a furnace charge, and furnacing the calcium carbonate so recovered with additional ground aluminous siliceous material and alkali metal compound.

4. In the process of treating aluminous siliceous materials containing a substantial proportion of silica by the process steps of mixing and sintering the material with an alkali earth metal compound and an alkali metal compound to form alkali earth metal silicates and alkali metal aluminate, and dissolving out the alkali metal aluminate from the sinter, the improvement which comprises treating the residue with carbon dioxide to form hydrated silica and alkali earth metal bicarbonate, separating hydrated silica therefrom, heating the bicarbonate to form alkali earth metal carbonate, and utilizing the carbonate thus obtained in forming additional mixes for sintering.

5. A process for treating aluminous siliceous material containing a substantial proportion of silica to recover alumina and hydrated silica, which comprises the process steps of mixing the material with a calcium compound recovered at a subsequent stage of the process and an alkali metal compound recovered at a subsequent stage of the process to form a furnace charge, sintering the charge, dissolving out the alkali metal aluminate from the sinter, thereby leaving a residue of calcium silicate, treating the alkali metal aluminate to recover alumina and sodium compound therefrom, treating the calcium silicate with an excess of carbon dioxide to form hydrated silica and soluble calcium bicarbonate, extracting the silica and recovering calcium carbonate in finely divided form suitable for incorporation in a furnace charge, and furnacing the calcium carbonate so recovered with additional ground aluminous siliceous material and alkali metal compound recovered from the alkali earth metal aluminate.

ROY C. FOLGER.